June 16, 1964  R. H. B. BUTEUX  3,137,107
BUFFING MOPS
Filed Sept. 17, 1962
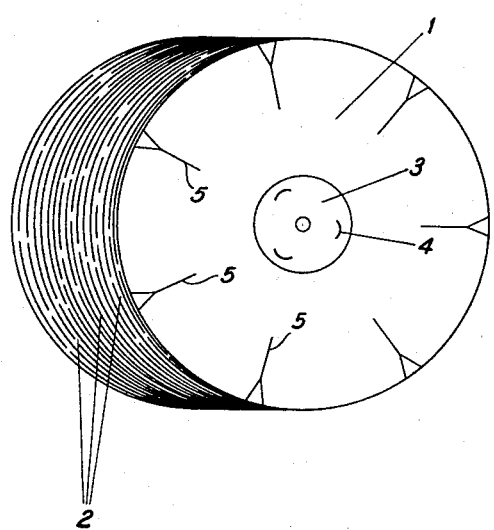
INVENTOR
RICHARD HAROLD BARCLAY BUTEUX
BY
Cushman, Darby & Cushman
ATTORNEYS

United States Patent Office 3,137,107
Patented June 16, 1964

3,137,107
BUFFING MOPS
Richard Harold Barclay Buteux, Welwyn Garden City, England, assignor to Imperial Chemical Industries Limited, London, England, a corporation of Great Britain
Filed Sept. 17, 1962, Ser. No. 223,963
Claims priority, application Great Britain Sept. 19, 1961
9 Claims. (Cl. 51—193)

This invention relates to "buffing mops" by which is meant resilient discs or pads which can be used with machine tools to polish or buff metals, plastics, e.g. acrylic resins, and the like.

In the past, buffing mops have been made by binding together several circular pieces of cloth, the binding being about a central hole through which a mounting spindle is passed.

It has been found that buffing mops can be very successfully constructed from circular pieces of plastic film, particularly when the film is oriented and more so when the film is at least partially crystalline. This is surprising as it would be expected that the use of plastic films in this way would cause undue wear and that the abrasive used with the mop (usually known as "buffing soap") would not be sufficiently picked up by the mop.

According to the present invention, there is provided a buffing mop comprising a stack of circular pieces of film made from a synthetic organic polymeric material and, optionally in addition, circular pieces of cloth, bound together by suitable means about a central hole through which a mounting spindle may be passed.

The synthetic organic polymeric films that may be used include the thermoplastic films formed from such polymeric materials, as, for example, polyethylene terephthalate, nylon, polypropylene, polyvinyl chloride and also films formed from cellulosic materials.

For making mops with the best wearing properties, the film should be oriented, preferably, though not necessarily, biaxially oriented. It is also preferable to use film that is at least partially crystalline (i.e. has a crystallinity of at least 5%). Preferably, for the best wearing properties, the film is biaxially oriented and is at least 50% crystalline. This may be accomplished by subjecting the film to a heat setting treatment after orientation; such films as nylon and polyethylene terephthalate biaxially oriented films are particularly useful. Several methods are known in the art for preparing biaxially oriented thermoplastic films, for example, as described in the prior publication "Biaxial Stretching of Polypropylene" by J. Jack, in British Plastics for June and July 1961, pages 312 to 318 and 391 to 394 respectively, which describes a number of methods for obtaining biaxially oriented films of all types of polymers by both the "tubular" and the "flat film" process.

For some applications where such a mop would heat up, the melting point of the film used should be relatively high, for example, above 160° C. and for the most severe applications above 200° C.

While polyethylene terephthalate film is very suitable, buffing mops have also been usefully constructed according to the invention from biaxially oriented polypropylene film. Such latter mops, if of small diameter, show a tendency for the pieces to melt together on vigorous use and are best made in the larger sizes where heat dissipation is better.

In some cases the mops described herein may not be as resilient as conventional mops. This may be overcome by interleaving the film with conventional mop material such as calico, having substantially the same diameter as the pieces of film. Another method of improving the resilience of the mop is to cut radial notches in at least some of the pieces of film. This method also has the advantage that the heat dissipation is improved.

The film thickness may be any of the usual thickness but films of thicknesses from 10 to 100 gauge are preferred (1 gauge=0.00001 in.). Thicker films suffer from the disadvantage that they are rather rigid, while thinner films are uneconomical to use. The preferred thicknesses are from 15 to 50 gauge. In general, the thinner the film the better, since this gives lighter and more resilient mops.

The preferred mop diameters range from 6 in. to 12 in. to reduce the risk of melting when the mops are used in the conventional manner. Any normal length of mop may be used but lengths of from 1 in. to 4 in. will in general be satisfactory.

Normally the pieces of film, and cloth (if used), will be supported and bound together with a reinforcing end plate of substantially less diameter than the pieces of film.

The mops may be bound together in any of the normal ways, but the following method is particularly suitable. A stack of circular pieces of centrally-apertured film (interleaved, if desired, with corresponding dimensioned pieces of cloth) is fitted with end plates which are preferably circular and less than half the diameter of the film pieces. The stack and end plates are held together by nails, screws, staples or bolts. When the end plates as well as the film, are made from a thermoplastic, the stack and end plates may be held together by welds made by passing a hot welding needle through the stack and end plates in order to melt the pieces together in the regions where they are contacted by the needle. It is preferred that the end plates are made from polythene or polypropylene sheets.

The invention is now illustrated with reference to the accompanying drawing.

In the drawing, a buffing mop 1 consists of a stack of circular pieces 2 of biaxially oriented and heat set polyethylene terephthalate film. The pieces 2 have a central hole and are bound together with plates 3 at both sides of the stack by nails 4 which are driven through the stack and plates and bent over the latter to hold the stack together. At least some of the pieces of film 2 may be provided with radial notches generally indicated by the reference numeral 5.

Buffing mops, as described hereinbefore, may be used in the normal manner as is well known in the art. Any of the commercially-available buffing soaps may be used. The mops may be used for buffing any of the usual materials requiring to be buffed but they are particularly useful for buffing plastics.

The invention is further illustrated by the following example.

*Example*

A buffing mop was made from a stack of 25 gauge polyethylene terephthalate film pieces 10 in. in diameter and two polythene end plates 3 in. in diameter. The stack and end plates were bolted together with four bolts to form a mop 2 in. long, and the assembly was mounted on a central spindle.

Various materials were buffed for varying periods of time in order to assess the wearing properties of the mops, using normal buffing soaps.

The wear was assessed as the loss in diameter of the buffing mop.

|  | Material | | | |
| --- | --- | --- | --- | --- |
|  | "Perspex" acrylic resin | Brass | Mild Steel | Stainless Steel |
| Mop, r.p.m. | 900 | 1,400 | 1,400 | 1,400 |
| Time (min.): | | | | |
| 20 | | | Negligible wear. | Negligible wear. |
| 45 | Negligible wear. | Negligible wear. | 1/16" diam. wear. | 1/16" diam. wear. |

The finish obtained with these mops was excellent and took no longer to achieve than with conventional mops.

I claim:

1. A buffing mop comprising a stack of circular pieces of a biaxially oriented film made from a synthetic organic thermoplastic material, each of said pieces of film having a central hole therein adapted for the passage of a mounting spindle therethrough, and means binding said pieces together about said central hole.

2. A buffing mop according to claim 1 including circular pieces of cloth of substantially the same diameter as the pieces of film interleaved with the film.

3. A buffing mop according to claim 1 including radial notches in at least some of the pieces of film.

4. A buffing mop according to claim 1 including reinforcing end plates of substantially smaller diameter than the pieces of film for supporting and binding together said pieces of film.

5. A buffing mop according to claim 4 in which the reinforcing end plates comprise a thermoplastic material.

6. A buffing mop according to claim 1 in which said film comprises polyethylene terephthalate.

7. A buffing mop according to claim 1 in which the film comprises polypropylene.

8. A resilient buffing mop comprising a stack of substantially circular pieces of a biaxially oriented film made from a synthetic organic thermoplastic material, each of said pieces of film having a central hole therein adapted for the passage of a mounting spindle therethrough, and reinforcing end plates of a thermoplastic material for binding tobether said pieces of film, said film having a crystallinity of at least 50% and a thickness of from 0.00010 to 0.0010 inch.

9. A buffing mop according to claim 8 wherein the stack and end plates are held together by hot needle welds.

References Cited in the file of this patent
UNITED STATES PATENTS

| 520,516 | Cleary | May 29, 1894 |
| 1,976,380 | Wilkinson | Oct. 9, 1934 |
| 2,712,987 | Storrs et al. | July 12, 1955 |
| 2,899,288 | Barclay | Aug. 11, 1959 |
| 2,943,426 | Schlegel | July 5, 1960 |
| 3,014,795 | Schmidlin | Dec. 26, 1961 |
| 3,027,247 | Gagarine | Mar. 27, 1962 |